(12) United States Patent
Xiang

(10) Patent No.: US 10,982,416 B2
(45) Date of Patent: Apr. 20, 2021

(54) LOCAL MULTIPLE PRESSURE ZONE FRESH WATER STORAGE AND SUPPLY SYSTEM

(71) Applicant: Jin Fu Xiang, Mountain View, CA (US)

(72) Inventor: Jin Fu Xiang, Mountain View, CA (US)

( * ) Notice: Subject to any disclaimer, the term of this patent is extended or adjusted under 35 U.S.C. 154(b) by 34 days.

(21) Appl. No.: 15/972,128

(22) Filed: May 5, 2018

(65) Prior Publication Data
US 2019/0203448 A1 Jul. 4, 2019

Related U.S. Application Data

(60) Provisional application No. 62/611,361, filed on Dec. 28, 2017.

(51) Int. Cl.
| | |
|---|---|
| *E03B 7/07* | (2006.01) |
| *E03B 7/04* | (2006.01) |
| *E03B 11/10* | (2006.01) |
| *F24D 17/00* | (2006.01) |

(52) U.S. Cl.
CPC ............... *E03B 7/07* (2013.01); *E03B 7/04* (2013.01); *E03B 7/075* (2013.01); *E03B 11/10* (2013.01); *F24D 17/00* (2013.01)

(58) Field of Classification Search
CPC . E03B 1/048; E03B 5/00; E03B 7/075; E03B 11/16; E03B 7/04; G05D 16/202; Y10T 137/86002; Y10T 137/86043; Y10T 137/86163; F04D 15/0066; F04D 15/0209; F04D 15/029; F04D 25/06; F04D 25/16
See application file for complete search history.

(56) References Cited

U.S. PATENT DOCUMENTS

| | | | |
|---|---|---|---|
| 2008/0217443 A1* | 9/2008 | Zacherl | A62C 25/00 239/722 |
| 2010/0307619 A1* | 12/2010 | Komatsu | F04D 15/0066 137/565.33 |
| 2013/0037114 A1* | 2/2013 | Sudhalkar | E03B 7/04 137/1 |
| 2013/0289781 A1* | 10/2013 | Kallesoe | F04D 13/14 700/282 |

\* cited by examiner

*Primary Examiner* — Hailey K. Do

(57) ABSTRACT

A method to distribute water from a private water tank to a user site includes connecting the private water tank to three parallel low pressure Variable Frequency Drive (VFD) pumps, two parallel high pressure VFD pumps, a pressure reducing valve (PRV), a tank level control valve, a flow meter, two pressure gauges, and two pressure transducers; controlling the three parallel low and two high pressure VFD pumps using a PLC programmed with at least first, second, and third low pressure pump set operation curves (LPP-SOCs) each specifying a low pressure pump operation set point (B) and a PRV operation set point (F) at each of first, second, and third flow rates and first and second high pressure pump set operation curves (HPPSOCs) each specifying a high pressure pump operation set point (G) and a high pressure pump energizing set point (E) at each of fourth and fifth flow rates.

18 Claims, 4 Drawing Sheets

LOCAL MULTIPLE PRESSURE ZONE FRESH WATER STORAGE AND SUPPLY SYSTEM

BACKGROUND

Field of the Invention

The present invention relates generally to an autonomous local fresh domestic water storage and supply system that has multiple adjustable pressure zones.

Description of the Related Art

This system can keep the water in a private water tank always fresh for emergency water demand in case the water system is disconnected to the city water supply system by nature disaster or operational accident. The use of emergency water storage system at local area has been expected for many years. However, there is little progress in keeping the stored domestic water fresh for a long period within the water storage system. None of previous invention can keep water always fresh to meet a large local water demand under emergency water supply circumstance.

SUMMARY

This water system can provide fresh water to the people during the catastrophic time, such as earthquake or city water contamination period when city water supply is no long available to user. The present invention has a fully automatic system combined with a high pressure water supply pump station, a low pressure water circulation pump station and a private water tank at the local area with an automation control panel that has the pressure modulating and autonomous monitoring functionality to manage water pressure limitation constraints and allow water to flow between different water pressure zones and integrate them into a single homogenous water distribution system for user with both the water directly from city water main and the water from a private water tank to remedy local water flow deficiencies in a reliable way with a sufficient capacity for all kinds of situations especially under an emergency condition.

DETAILED DESCRIPTION OF THE PREFERRED EMBODIMENT

Figure 1:
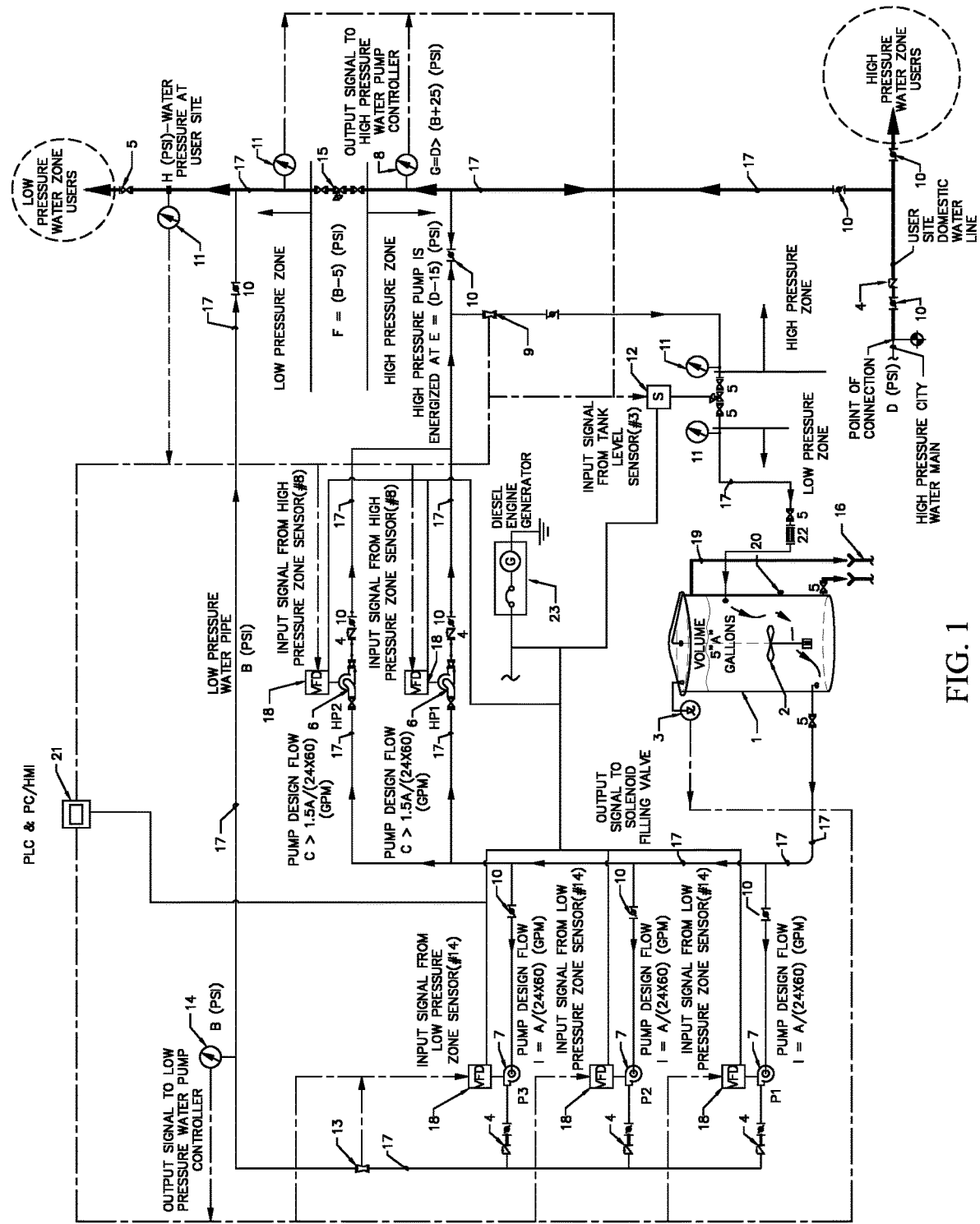
FIG. 1 shows a system flow diagram that comprises of one water tank, three parallel low pressure Variable Frequency Drive (VFD) pumps, two parallel high pressure VFD pumps, one pressure reducing valve (PRV), one tank level control valve, one flow meter, two pressure gauges, two pressure transducers, one Programmable Logic Controller (PLC) and a Personal Computer which works as to a control center for Human Machine Interface (HMI).

The invention relates to an application of parallel pumping. When the three parallel low pressure VFD pumps are applied, each of the three parallel low pressure VFD pumps operates at the same head, and provides its share of the water supply system flow at the low pressure pump operation pressure set point (B). (FIGS. 1 & 2)

Figure 2:
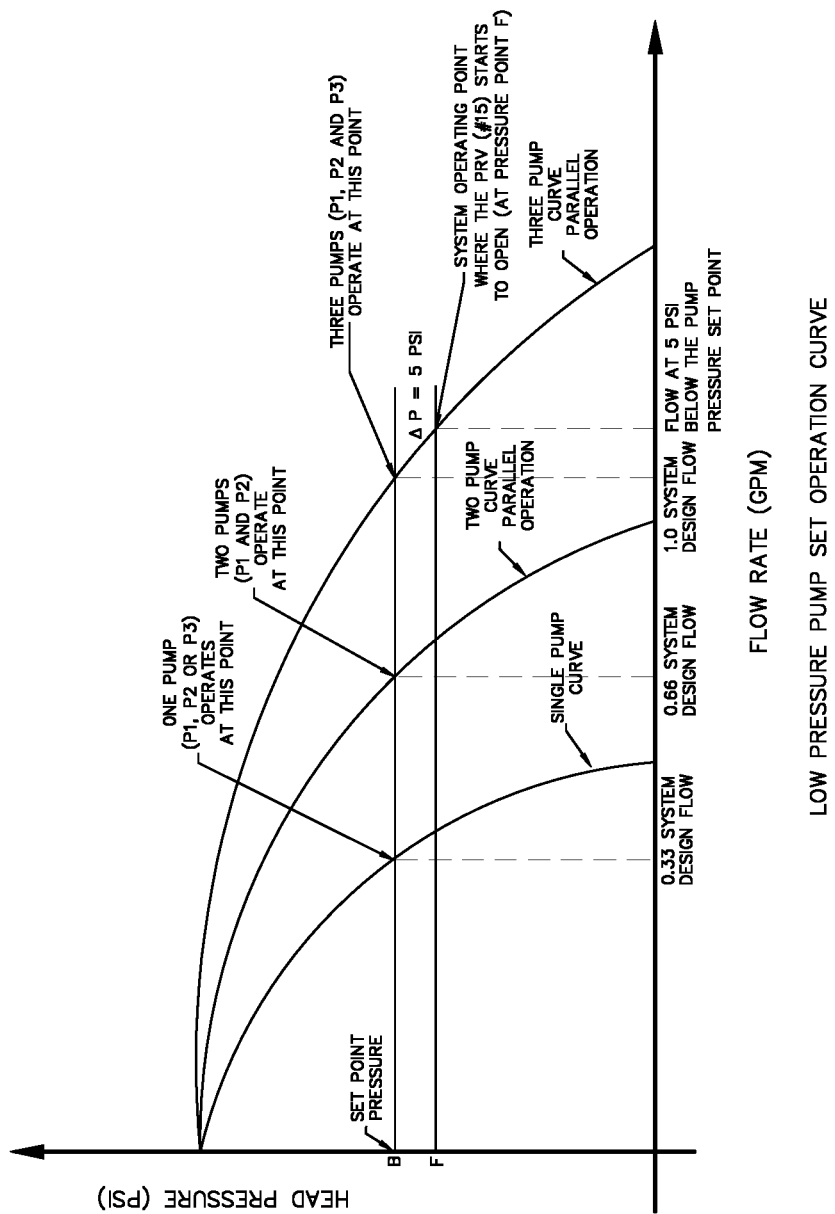
FIG. 2 shows the operation curve of three low pressure pumps (#7) in a parallel configuration (See FIG. 1 for component number) and a low pressure VFD pump (#7) operation pressure set point (B) and the PRV (#15) opening pressure set point (F), wherein F=B-5 psi.

When system flow exceeds the design flow of the three parallel low pressure VFD pumps, the output pressure of the three parallel low pressure VFD pumps (see FIG. 2) will drop to certain degree per pump curve of parallel operation (see pump curves of FIG. 2). Based on designed sequence of operation, the pressure reducing valve pressure set point (F) is 5 psi below the low pressure pump operation pressure set point (B). (FIG. 2)

When the user water demand increases, the low pressure VFD pump output pressure will drop 5 psi from the low pressure pump operation pressure set point (B) to the pressure reducing valve pressure set point (F), and Pressure Reducing Valve (#15) will open and provide additional flow to meet the increased user water demand in order to reduce the low pressure VFD pump size and its energy consumption. (FIG. 1)

Figure 3:
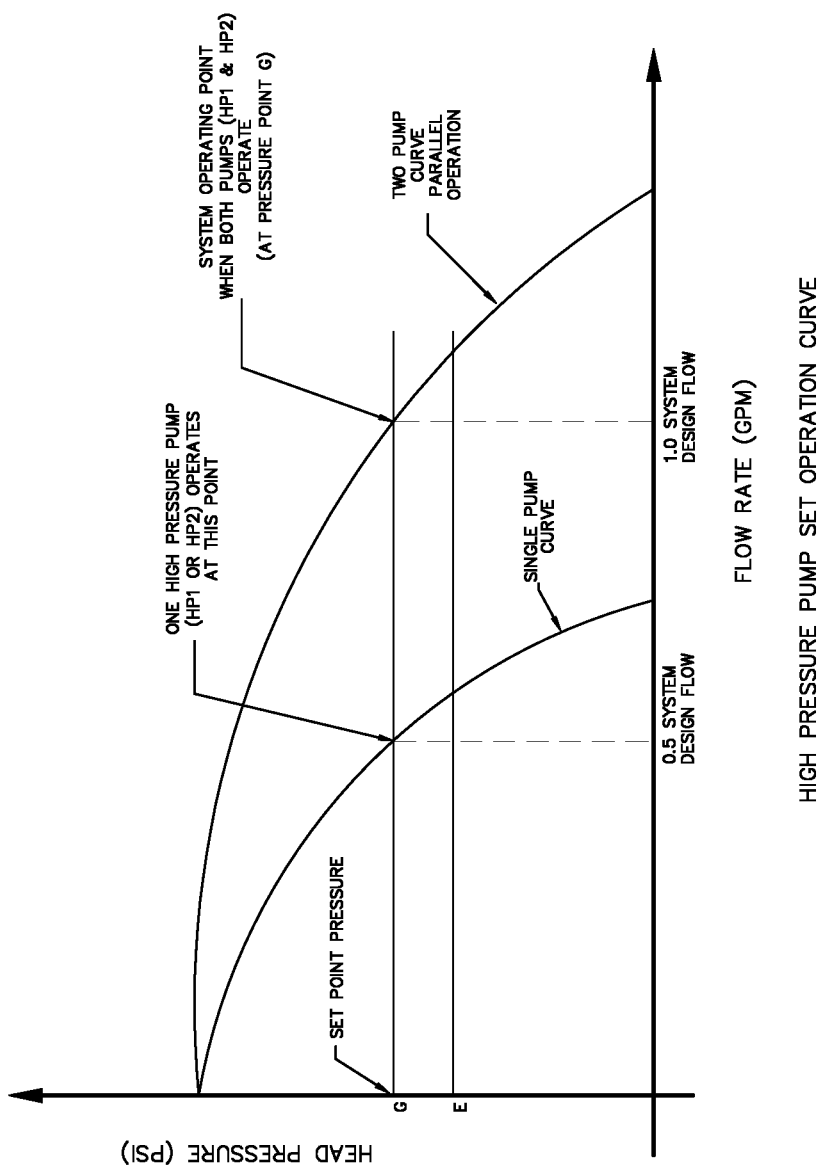
FIG. 3 shows the operation curve of two parallel high pressure VFD pumps (#6) in a parallel configuration (See FIG. 1 for component number) and a high pressure VFD pump (#6) operation pressure set point (G); Also, the high pressure VFD pumps (#6) are energized at pressure (E) wherein E=G-15 psi.
Figure 4:
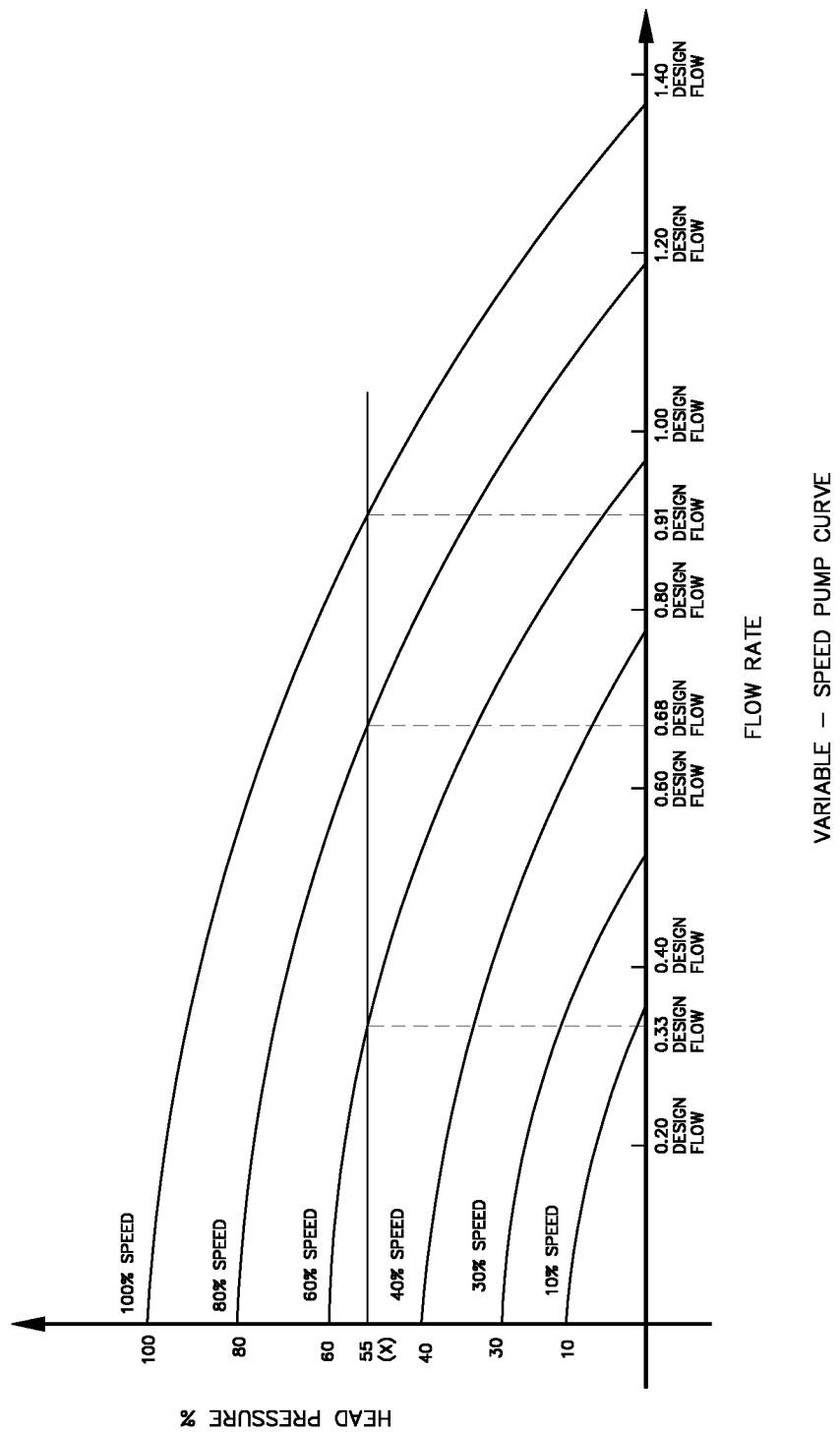
FIG. 4 shows that the pump is operated with variable-speed drive which adjusts the speed of the electric motor and changes the pump curve. The pump variable speed drive is applied to control the required variable flow demand at the local water system at a constant output pressure set point. For example, in this figure, the pump operation set point (X) is 55% pump maximum head pressure. the pump, at 60% speed, can provide 0.33 design flow, at 80% speed, it can provide 0.68 design flow, and at 100% speed it can provide 0.91 design flow. In this particular case, X could be substituted by B for the three parallel low pressure VFD pumps and by G for the two parallel high pressure VFD pumps.

At upstream of pressure reducing valve there is the high-pressure zone of water at the high pressure VFD pump pressure set point (G). (FIGS. 1 & 3)

In the high-pressure water zone, two parallel high pressure VFD pumps will be energized when the city water main pressure is 15 psi below its normal pressure (D), the normal pressure being adjustable, where the two parallel high pressure VFD pumps can run only one individually or two together in parallel depending on the local community water demand to maintain high pressure zone water pressure above an energizing set point pressure (E). (FIGS. 1 & 3)

High Pressure VFD Pump has an Energizing Setpoint pressure (E), wherein E=D−15 psi, and a high pressure VFD pump pressure set point (G), wherein G=D and D>B+25 psi. (FIGS. 1 & 3)

All pumps in this invention are centrifugal pumps operated with variable—frequency drives, which adjust the speed of the electric motor and change the pump curve. In this application, the programmable logic controller of high and low pressure water pump station and the variable frequency drives are applied for the pumps to meet the required variable flow demand of water supply system at a constant output pressure (adjustable). One of requirements of this design is to maintain a pump output setpoint pressure for the variable flow demand of the water supply system. The output setpoint pressure is sensed at the downstream of check valves (#4) on the output manifold of both parallel high and low pressure pumps. It is far more likely that a small incremental rise in demanded supply flow will have a corresponding small increase in pump speed to maintain a constant low pressure pump operation pressure set point (B), for the low-pressure water pump station and constant operation pressure set point (G), for the high-pressure water pump station. (FIGS. 1, 2, 3 & 4)

In one embodiment, a system that can store and distribute fresh domestic water with various water pressure zones at a large local community user site through one water tank, two parallel high pressure VFD Water pumps, three parallel low pressure VFD water pumps, one pressure reducing valve, one tank level control valve and a series of both Shut off Valves (SOV) and check valves. To minimize the electric power consumption the water system can supply city water directly to the user site bypass the water storage tank during water usage peak period without energizing high pressure pumps unless city water is out of service due to an emergency circumstance. If city water is out of service two parallel high pressure VFD Water pumps can be used to supply water to high pressure zone users and to low pressure zone users through a pressure reducing valve during its water usage peak period.

In another embodiment, a system that can keep potable water always fresh in a water tank with a 5-day (adjustable per user) turnover rate with three small flow volume parallel low pressure VFD water pumps. Given a daily local community site's water usage is "A" gallons, the tank volume shall be 5×"A" gallons. Therefore, the tank water can be refreshed once for every five days.

In yet another embodiment, to eliminate the stagnant water and water vertical stratification a water mixer is installed inside the water tank, see FIG. 1 for water tank details.

In a further embodiment, system that is able to integrate different water pressure zones to one homogenous water system that can meet multiple purpose water usage and demand for a local user site during regular and emergency time and operates as to an autonomous local water distribution system controlled by computers and electronics devices which consists of a Programmable Logic Controller (PLC) and one Personal Computer for Human Machine Interface (HMI). A diesel engine generator is provided as to a backup power for the water pump station with both low and high pressure pumps during local public utility power outage.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes that come within the meaning and range of equivalency of the claims are to be embraced within their scope

TABLE OF DRAWING ELEMENTS

1. Large Volume Private Water Tank
2. Water Mixer Motor
3. Level Sensor and Transducer
4. Check Valve
5. Shut Off Valve
6. High Pressure Pump
7. Low Pressure Pump
8. Pressure Gauge and Transducer for High Pressure Pump Head Control
9. Flow Meter and Transducer for Pump Flow Testing
10. Butterfly Valve
11. Electronics Pressure Sensor and Display
12. Solenoid Tank Level Control Valve (Water Filling Valve that has both shutoff and pressure reducing functions)
13. Flow Sensor for Water Usage Measurement
14. Pressure Gauge and Transducer for Low Pressure Pump Head Control
15. Pressure Reducing Valve
16. Drain
17. Water pipe
18. Variable Frequency Drive
19. Over Flow
20. Chemical Injection Pot for Tank Washing
21. Programmable Logic Controller (PLC) & Personal Computer (PC) for Human Machine Interface (HMI)
22. Flexible Pipe Connection
23. Diesel Engine Generator

The invention claimed is:

1. A method to distribute water from a private water tank to a user site, comprising:

connecting a private watertank to three parallel low pressure Variable Frequency Drive (VFD) pumps, two parallel high pressure VFD pumps, a pressure reducing valve (PRV), a tank level control valve, a flow meter, two pressure gauges, two pressure transducers and a Programmable Logic Controller (PLC) & a Personal Computer (PC) for Human Machine Interface (HMI);

controlling the three parallel low pressure VFD pumps using the PLC programmed with at least first, second, and third low pressure pump set operation curves (LPPSOCs) each specifying a low pressure pump operation pressure set point (B) and a PRV operation pressure set point (F) at each of first, second, and third flow rates, wherein the PRV opens if a low pressure zone operating pressure falls below the PRV operation pressure set point, and a first pressure differential is defined between the low pressure pump operation pressure set point and the PRV operation pressure set point; and applying the PLC to control the two parallel high pressure VFD pumps using at least first and second high pressure pump set operation curves (HPPSOCs) each specifying high pressure pump operation pressure set point (G) and a high pressure pump energizing set point (E) at each of fourth and fifth flow rates, wherein the PLC turns on at least one of the two parallel high pressure VFD pumps if a high pressure zone operating pressure is detected to fall below the high pressure pump energizing set point, and a second pressure differential is defined between the high pressure pump operation set point and the high pressure pump energizing set point.

2. The method of claim 1, wherein the first pressure differential is 5 pounds per square inch (psi), the three parallel low pressure VFD pumps are set to operate at the low pressure pump operation pressure set point (B), wherein a low pressure zone is monitored by a first pressure sensor disposed downstream of the PRV, and the PRV opens at the PRV operation pressure set point (F) automatically and the PRV operation pressure set point (F) is 5 psi lower than the low pressure pump operation pressure set point (B).

3. The method of claim 1, wherein the second pressure differential is 15 psi, the two parallel high pressure VFD pumps are maintained in an off position until the high pressure pump energizing set point pressure (E) is detected in a high pressure zone by a first pressure sensor disposed upstream of the PRV, and when the pressure of the high pressure zone falls below the high pressure pump energizing set point pressure (E), the PLC signals at least one of the two parallel high pressure VFD pumps to turn on and raise the pressure of the high pressure zone to the high pressure pump operation pressure set point (G), which is equal to the normal pressure of a city water main (D) and 15 psi higher than the high pressure pump energizing set point pressure (E).

4. The method of claim 1, comprising conforming to a pump operation set point for 55% pump maximum head pressure by operating at least one of the three parallel low pressure and two parallel high pressure VFD pumps, at 60% speed, to provide a 0.33 design flow, at 80% speed, to provide 0.68 design flow, and at 100% speed to provide a 0.91 design flow for a water usage demand.

5. The method of claim 1, comprising holding water in the private water tank to be refreshed once every five days.

6. The method of claim 1, comprising eliminating stagnant water or water vertical stratification inside the private water tank through a water mixer.

7. The method of claim 1, comprising integrating different water pressure zones to one homogenous water system and meeting multiple purpose water usage and demand for the user site during regular and emergency time.

8. The method of claim 1, comprising variably adjusting a speed of an electric motor with a variable frequency drive (VFD) and changing a pump curve.

9. The method of claim 8, wherein the variable frequency drive (VFD) is applied to control a predetermined variable flow demand at a constant output pressure set point.

10. The method of claim 1, comprising minimizing electric power consumption by supplying city municipal water directly to the user site and bypassing the private water tank along with water from the private water tank discharged by the three parallel low pressure VFD pumps disposed downstream of the PRV during a water usage peak period without energizing the two parallel high pressure VFD pumps.

11. The method of claim 10, comprising activating the two parallel high pressure VFD pumps to supply water to high pressure zone users and to low pressure zone users through the PRV during a water usage peak period, if the city water main is out of service.

12. The method of claim 1, comprising controlling water flow with a Programmable Logic Controller (PLC) and a Personal Computer (PC) which works as to a control center for Human Machine Interface (HMI).

13. The method of claim 12, comprising providing on site backup power generation with a Diesel Engine Generator.

14. The method of claim 12, comprising providing backup power with a diesel engine generator to the three parallel low pressure VFD pumps and the two parallel high pressure VFD pumps during local public utility power outage.

15. A system, comprising:
a private water tank;
at least one user site coupled to the private water tank;
at least three parallel low pressure Variable Frequency Drive (VFD) pumps;
at least two parallel high pressure VFD pumps;
a pressure reducing valve (PRV);
a tank level control valve;
a flow meter;
at least one pressure gauges;
at least one pressure transducers; and
a Programmable Logic Controller (PLC) to control the at least three parallel low pressure VFD pumps programmed with at least first, second, and third low pressure pump set operation curves (LPPSOCs) each specifying a low pressure pump operation pressure set point (B) and a PRV operation pressure set point (F) at each of first, second, and third flow rates, wherein the PRV opens if a low pressure zone operating pressure falls below the PRV operation pressure set point, wherein a first pressure differential is defined between the low pressure pump operation pressure set point and the PRV operation pressure set point; wherein the PLC further controls the at least two parallel high pressure VFD pumps using at least first and second high pressure pump set operation curves (HPPSOCs) each specifying a high pressure pump operation pressure set point (G) and a high pressure pump energizing set point (E) at each of fourth and fifth flow rates, wherein the PLC turns on at least one of the two parallel high pressure VFD pumps if a high pressure zone operating pressure is detected to fall below the high pressure pump energizing set point, and a second pressure differential is defined between the high pressure pump operation pressure set point and the high pressure pump energizing set point.

16. The system of claim 15, wherein the first pressure differential is 5 psi.

17. The system of claim 15, wherein the second pressure differential is 15 psi.

18. The system of claim 15, wherein the PLC variably adjusts a speed of an electric motor with a variable frequency drive to change a pump curve.

* * * * *